(12) United States Patent
Momose

(10) Patent No.: US 12,513,379 B2
(45) Date of Patent: Dec. 30, 2025

(54) IMAGE PICKUP APPARATUS

(71) Applicant: CANON KABUSHIKI KAISHA, Tokyo (JP)

(72) Inventor: Hideaki Momose, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 18/652,918

(22) Filed: May 2, 2024

(65) Prior Publication Data

US 2024/0397175 A1    Nov. 28, 2024

(30) Foreign Application Priority Data

May 24, 2023   (JP) ................. 2023-085414

(51) Int. Cl.
*H04N 23/52*   (2023.01)
*H04N 23/50*   (2023.01)
*H04N 23/54*   (2023.01)
*H04N 23/68*   (2023.01)

(52) U.S. Cl.
CPC ............ *H04N 23/52* (2023.01); *H04N 23/50* (2023.01); *H04N 23/54* (2023.01); *H04N 23/687* (2023.01)

(58) Field of Classification Search
None
See application file for complete search history.

(56) References Cited

U.S. PATENT DOCUMENTS

| | | | |
|---|---|---|---|
| 2017/0272710 A1* | 9/2017 | Mikawa | H04N 9/3194 |
| 2017/0272718 A1* | 9/2017 | Mikawa | H04N 9/3188 |
| 2019/0018258 A1* | 1/2019 | Minamisawa | H04N 23/687 |
| 2022/0264013 A1* | 8/2022 | Ishibiki | H04N 23/50 |
| 2022/0294957 A1* | 9/2022 | Iwasaki | H04N 23/68 |
| 2023/0102719 A1* | 3/2023 | Abe | H04N 23/6812 |
| | | | 396/55 |

FOREIGN PATENT DOCUMENTS

JP   2019020466 A   2/2019

* cited by examiner

*Primary Examiner* — Paul M Berardesca
(74) *Attorney, Agent, or Firm* — Cowan, Liebowitz & Latman, P.C.

(57) ABSTRACT

An image pickup apparatus includes a movable unit that holds an image sensor, a fixed unit that supports the movable unit movably in a direction orthogonal to an optical axis direction, and a first heat conductive member configured to radiate heat from the movable unit. The movable unit includes a restricting member. The fixed unit has a contact portion configured to come into contact with the restricting member to restrict the movable unit from moving. The first heat conductive member radiates the heat from the movable unit via the restricting member.

16 Claims, 6 Drawing Sheets

IMAGE PICKUP APPARATUS

BACKGROUND

Technical Field

One of the aspects of the embodiments relates to an image pickup apparatus.

Description of Related Art

An image pickup apparatus such as a digital camera includes an image sensor configured to convert an object image captured through an imaging lens (imaging optical system) into a digital image. In such an image sensor, heat is generated during driving, and depending on the generated heat amount, noise may be generated in the image, which may be a factor in degrading the image quality. Therefore, the heat generated by the image sensor is to be radiated. Japanese Patent Laid-Open No. 2019-20466 discloses an image pickup apparatus that improves heat dissipation by disposing a heat conductive member on the back of a substrate mounted with an image sensor and by transmitting heat to a rotational shaft for rolling correction. On the other hand, image pickup apparatuses have recently been known that perform image stabilization by moving an image sensor in a direction orthogonal to an optical axis of an imaging optical system in order to improve image quality.

A configuration disclosed in Japanese Patent Laid-Open No. 2019-20466 that performs image stabilization configured to move the image sensor in the direction orthogonal to the optical axis direction of the imaging optical system cannot improve heat dissipation from the image sensor.

SUMMARY

An image pickup apparatus according to one aspect of the disclosure includes a movable unit that holds an image sensor, a fixed unit that supports the movable unit movably in a direction orthogonal to an optical axis direction, and a first heat conductive member configured to radiate heat from the movable unit. The movable unit includes a restricting member. The fixed unit has a contact portion configured to come into contact with the restricting member to restrict the movable unit from moving. The first heat conductive member radiates the heat from the movable unit via the restricting member.

Further features of various embodiments of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

First Embodiment

Figure 1:
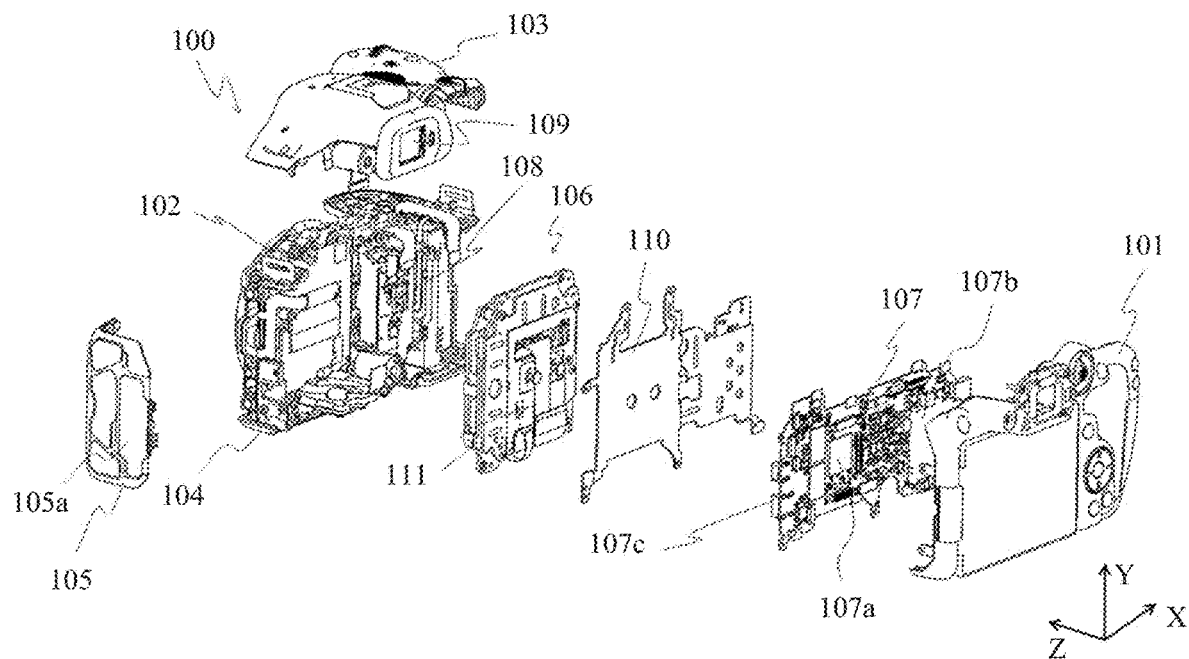
FIG. 1 is an exploded perspective view of an image pickup apparatus according to each embodiment.

A description will now be given of a digital camera (image pickup apparatus) 100 according to a first embodiment. FIG. 1 is an exploded perspective view of the digital camera 100 viewed from the back. As illustrated in FIG. 1, the digital camera 100 includes a rear cover 101, a front base 102, a top cover 103, a bottom cover 104, and a side cover 105. Disposed inside the digital camera 100 are an image sensor unit 106 having an image stabilizing mechanism, a main substrate 107, a shutter 108, a finder 109, and a chassis (heat radiating metal plate) 110. In this embodiment, a lens apparatus having an optical system (imaging optical system) is attachable to and detachable from the digital camera 100. However, this embodiment is not limited to this example, and is applicable to an image pickup apparatus in which a camera body and a lens apparatus are integrated.

The image sensor unit 106 includes a movable unit 114 that holds the image sensor 115, a fixed unit 113 that supports the movable unit 114 movably in a direction (an arbitrary direction in an XY plane) orthogonal to an optical axis direction (Z direction). Due to this configuration, the movable unit 114 performs image stabilization by moving in a direction orthogonal to the optical axis direction relative to the fixed unit 113.

The front base 102 is made of magnesium die-casting or resin, for example. The main substrate 107 includes a multilayer substrate mounted with electronic components on both sides. The main substrate 107 is fixed to the front base 102 and the metal chassis 110 with screws. Mounted on the main substrate 107 are a control IC 107a for controlling imaging signals and the like, a recording-medium connector 107b for storing an external recording medium, and an external communication terminal 107c for connecting a connection cable to an external device. The external communication terminal 107c is covered with a terminal cover 105a.

The image sensor unit 106 is a member of the digital camera 100 that consumes particularly a large power amount and generates a large heat amount. A temperature rise is significant in the image sensor unit 106. The imaging time of the digital camera 100 is limited by the guaranteed operating temperature of each member. In order to maintain the imaging time as long as possible, it is necessary to take measures to dissipate the heat from the image sensor unit 106, which is a heat source, so that the temperature does not exceed the guaranteed operating temperature. The image sensor unit 106 is fixed to the front base 102 with screws. By connecting a heat conductive sheet (first heat conductive member) 126, which will be described below, to the chassis 110, the heat of the image sensor unit 106 is dissipated to the front base 102 and the chassis 110.

Figure 2:
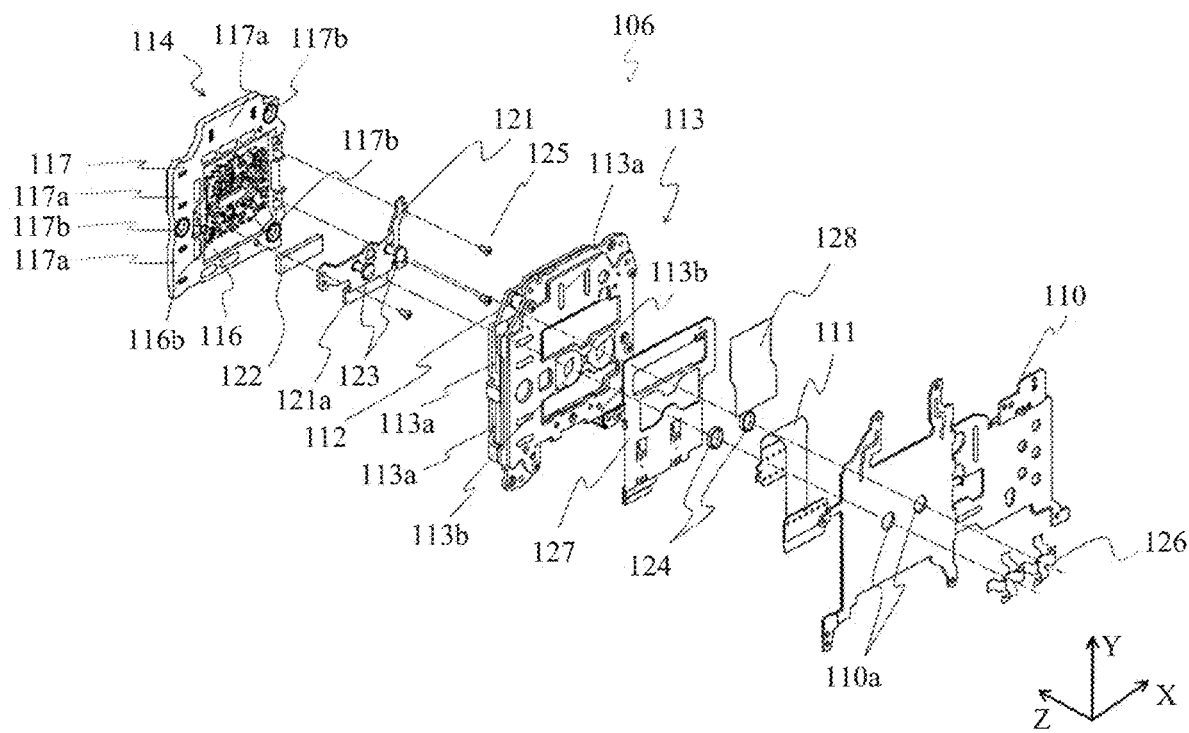
FIG. 2 is an exploded perspective view of an image sensor unit according to a first embodiment.
Figure 3A:
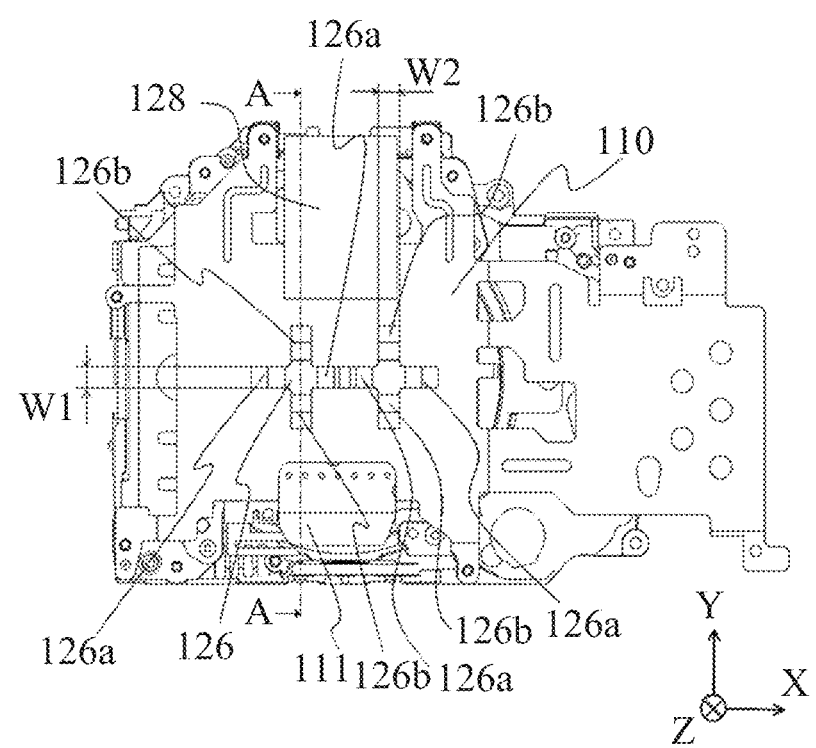
FIGS. 3A and 3B are configuration diagrams of the image sensor unit according to the first embodiment.
Figure 3B:
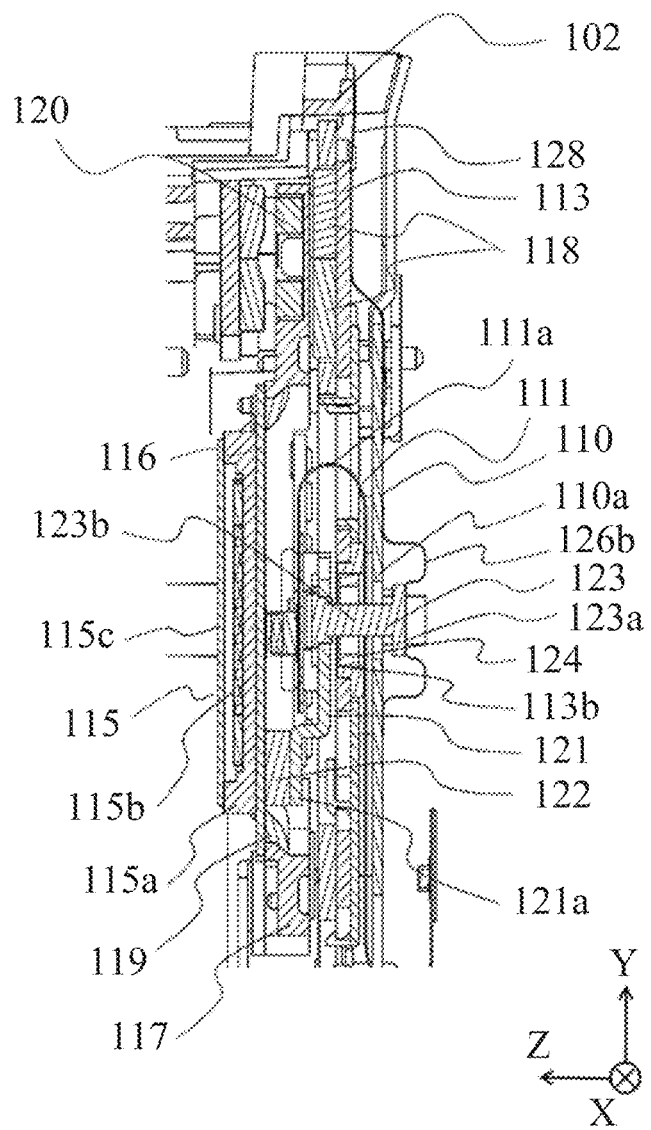

Referring now to FIGS. 2, 3A, and 3B, a detailed description will be given of the image sensor unit 106. FIG. 2 is an exploded perspective view of the image sensor unit 106 viewed from the back side. FIGS. 3A and 3B are configuration diagrams of the image sensor unit 106. FIG. 3A is a rear view of the image sensor unit 106, and FIG. 3B is a partial sectional view taken along a line A-A in FIG. 3A.

The movable unit 114 includes an imaging substrate 116 mounted with an image sensor 115, a sensor holder (sensor plate) 117 adhered to the imaging substrate 116, and the like. The sensor holder 117 holds a coil 120 and a Hall element configured to drive the movable unit 114 in three coil portions 117a. The fixed unit 113 holds three magnets 118 in magnet portions 113a facing the coil portions 117a. The movable unit 114 is attracted and held by the magnets 118. Balls are disposed in ball holders 117b provided on the sensor holder 117. A distance between the movable unit 114 and the fixed unit 113 is kept constant by the balls so as not to be affected by friction. The movable unit 114 can be moved by changing the current amount applied to the coil portion 117a. Moving the movable unit 114 in a direction that cancels out the shake of the body of the digital camera 100 can perform image stabilization.

In the image sensor 115, a sensor chip 115b is bonded to a lid 115a made of ceramic, electrically connected to wiring provided on the lid 115a by wire bonding, and sealed with glass 115c. The image sensor 115 is mounted on the imaging substrate 116, and the imaging substrate 116 and the sensor holder 117 are fixed with an adhesive 119. The adhesive 119 is applied across the imaging substrate 116 and the sensor holder 117, and is cured by irradiation with ultraviolet light. Devices 116b such as a capacitor, a resistor, and a regulator of an imaging circuit are mounted on the back side of the image sensor 115 of the imaging substrate 116.

The electrical connection between the imaging substrate 116 and the main substrate 107 is performed using an imaging flexible printed circuit (imaging FPC) 111. The imaging FPC 111 transmits an imaging signal output from the image sensor 115 and a control signal necessary to drive the image sensor 115 to a control IC 107a on the main substrate. The imaging FPC 111 supplies power for driving the image sensor 115. Connection between the imaging substrate 116 and the imaging FPC 111 is performed using an inter-substrate connector. Inter-substrate connectors on the receptacle and plug sides are engaged with each other to establish an electrical connection.

The imaging FPC 111 has a U-turn (U-shaped) portion 111a that allows the imaging FPC 111 to make a U-turn. The U-turn portion 111a can absorb a shift when the movable unit 114 moves, and prevent the movement of the movable unit 114 from being hindered by the stiffness of the imaging FPC 111. The U-turn portion 111a can suppress breakage of the wiring within the imaging FPC 111. The imaging FPC 111 is a single-sided FPC. Due to this configuration, in comparison with a double-sided FPC, the amounts of copper foil and coverlay can be reduced, and the stiffness of the imaging FPC 111 can be reduced. Thereby, the load in moving the movable unit 114 can be reduced, and the durability in the repeated bending can be increased.

A heat radiating plate 121 is fixed to the sensor holder 117 with screws 125. The heat radiating plate 121 has an extension portion 121a, and a heat conductive rubber (a third heat conductive member having elasticity) 122 is disposed between the heat radiating plate 121 and the imaging substrate 116. Restricting shafts 123 are caulked to the heat radiating plate 121. The heat radiating plate 121 and the restricting shaft 123 are made of materials with high thermal conductivity such as aluminum and copper. The restricting shaft 123 is inserted into a restricting hole (contact portion, hole portion) 113b formed in the fixed unit 113. In a case where the movable unit 114 moves to a restricting position, the restrictors 123b of the restricting shafts 123 come into contact with the restricting holes 113b, and the movable unit 114 is restricted from moving. Thus, the restricting holes 113b in the fixed unit 113 contact the restricting shafts 123 and restrict the movable unit 114 from moving. The heat conductive sheet 126 radiates heat from the movable unit 114 via the restricting shafts 123.

Buffer members (second heat conductive member) 124 are disposed between the restrictors 123b of the restricting shafts 123 and the restricting holes 113b of the fixed unit 113. That is, the restricting holes 113b are provided with the buffer members 124, and the restricting shafts 123 can come into contact with the restricting holes 113b via the buffer members 124.

Reference numeral 127 denotes a fixed unit cover. The restricting shafts 123 are inserted into holes 110a provided in the chassis 110. A flange portion (heat radiator) 123a that is larger than a shaft diameter is provided at the tip of the restricting shaft 123, and a heat conductive sheet 126 that radiates heat from the movable unit 114 is attached to the flange portion 123a. The flange portion 123a is provided extending from the restrictor 123b in the optical axis direction, and the heat conductive sheet 126 radiates heat from the movable unit 114 via the flange portion 123a. In this embodiment, when viewed from the optical axis direction (Z direction) (in the XY section), the sectional area of the flange portion 123a is larger than the sectional area of the restrictor 123b.

The other end of the heat conductive sheet 126 is attached to the chassis 110, and the restricting shaft 123 and the chassis 110 are thermally connected. The flange portion 123a is not limited to a circular shape, and may have another shape, such as a rectangle, to which the heat conductive sheet 126 can be easily attached. The heat conductive sheet 128 is attached to the chassis 110, the front base 102, and the fixed unit 113. In this embodiment, when viewed from the optical axis direction, the restricting shafts 123 are disposed within a range of the projected area of the image sensor 115.

A description will now be given of a heat radiating path from the image sensor 115. The heat from the image sensor 115 is transmitted to the imaging substrate 116. The heat from the imaging substrate 116 is transmitted to the heat radiating plate 121 via the heat conductive rubber 122. This heat is transmitted to the restricting shafts 123 provided on the heat radiating plate 121 and the heat conductive sheets 126 in this order, so that the heat can be released to the chassis 110. The chassis 110 is made of aluminum, is a metal plate larger than metal parts around the image sensor 115, and has a higher heat capacity. Therefore, transmitting the heat of the image sensor 115 to the chassis 110 can further reduce the temperature of the image sensor 115.

Since the imaging substrate 116 contacts the sensor holder 117 and is bonded with the adhesive 119, the heat is transmitted to the sensor plate. Since the sensor holder 117 and the heat radiating plate 121 are fixed with screws, heat can be transmitted to the heat radiating plate 121 not only via the heat conductive rubber 122 but also via the sensor plate. Disposing the heat conductive rubber 122 at a location on the imaging substrate 116 that is particularly hot can enhance the heat dissipation effect. For example, a circuit unit that generates heat is formed within the sensor chip 115b. Disposing the heat conductive rubber 122 directly under the circuit unit can reduce heat radiation loss and effectively release heat. Instead of the heat conductive rubber 122, a member obtained by wrapping a graphite sheet around an elastic member such as a sponge may be used.

The fixed unit 113 is fixed to the front base 102 with screws. The heat of the image sensor 115 is also radiated to the front base 102 side. The heat conductive sheet 128 has a role of further diffusing the heat of the chassis 110 to the front base 102.

Figure 4A:
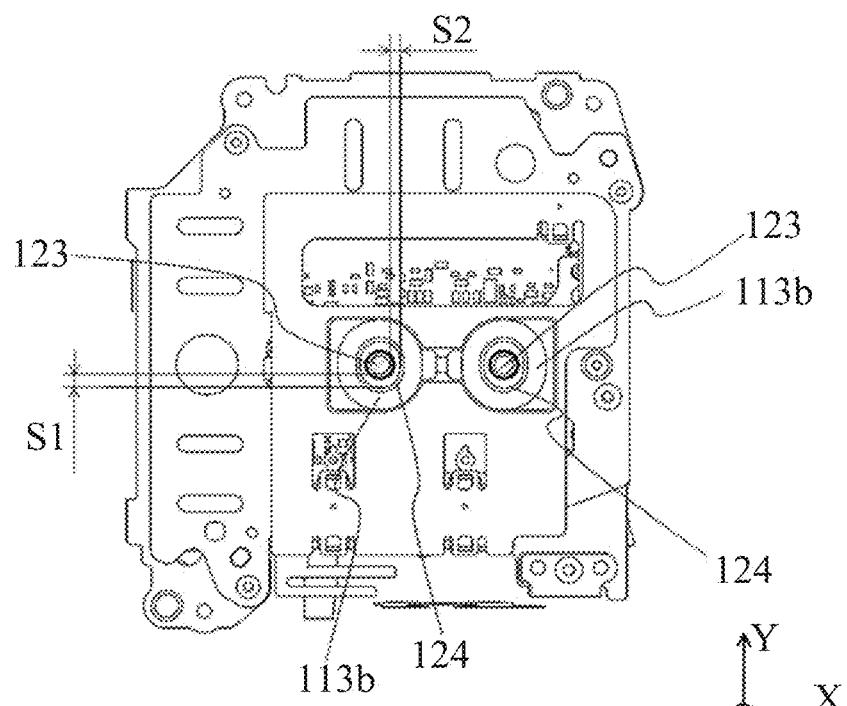
FIGS. 4A and 4B are configuration diagrams of a restrictor regarding a movable unit in the first embodiment.
Figure 4B:
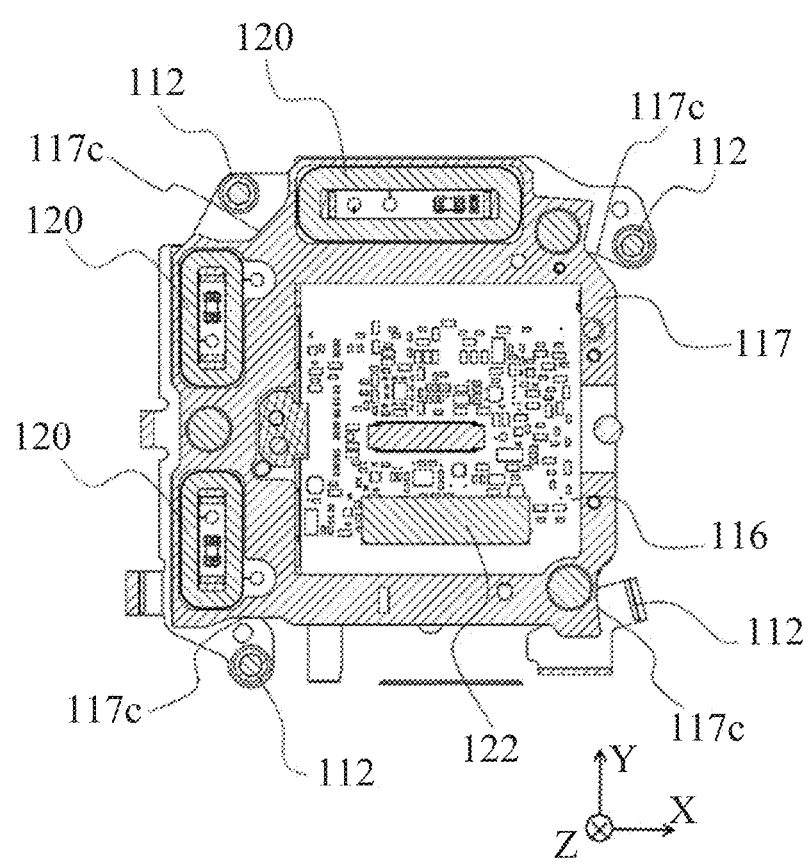

Referring now to FIGS. 4A and 4B, a description will be given of a movement restricting structure on the movable unit 114. FIGS. 4A and 4B are configuration diagrams of the restrictor regarding the movable unit 114. FIG. 4A is a sectional view of the restrictor by the restricting shaft 123 at the center of the movable unit 114, and FIG. 4B is a sectional view of the restrictor outside the movable unit 114. The movable unit 114 moves in the XY directions and in the rotational direction around the Z-axis (Z direction) as the optical axis (optical axis direction) of the optical system (imaging optical system). Movement of the movable unit 114 is restricted in two areas: the center of the movable unit 114 and the outside of the movable unit 114. The central restrictor mainly restricts the movable unit 114 from moving in the XY directions, and the outer restrictor restricts the movable unit 114 from moving in a rotational direction of the Z-axis as the optical axis of the image pickup apparatus, in addition to the XY directions.

First, the central restrictor restricts the movable unit 114 from moving when the restrictor 123b of the restricting shaft 123 comes into contact with the restricting hole 113b. The buffer member 124 is disposed between the restrictor 123b of the restricting shaft 123 and the restricting hole 113b of the fixed unit 113. In a case where the digital camera 100 is powered on, the movable unit 114 is driven so that the center of the angle of view of the image sensor 115 coincides with the center of the optical axis. In a case where the digital camera 100 is powered off, the movable unit 114 is not driven. At this time, the movable unit 114 is in a state where the restricting shaft 123 contacts each buffer member 124 due to its weight. By using a member with high thermal conductivity such as heat conductive rubber as the buffer member 124, the heat can be radiated from the restricting shaft 123 to the fixed unit 113 while the movable unit 114 is not driven. Thus, the heat of the image sensor 115 can be more efficiently reduced while the digital camera 100 is powered off.

A description will now be given of a restriction on the outside of the movable unit 114, which is performed when the fixed-side restricting members 112 provided at the four corners of the fixed unit 113 and the movable-side restricting member 117c of the sensor holder 117 come into contact with each other. The fixed-side restricting member 112 has the buffer member 124 made of rubber or the like attached to a shaft or a metal plate.

In a case where the movable unit 114 is driven in the rotational direction about the Z-axis as the optical axis, a moving distance of the movable unit 114 increases at its part that is more distant from the center. In order to accurately restrict movement in the rotational direction, the restrictor may be used.

In a case where the movable unit 114 is connected via the heat conductive sheet 126 that is flexible, such as a graphite sheet, to a part other than the movable unit 114, the length must be determined in consideration of a moving amount to avoid breakage etc. This embodiment uses as a heat radiating path the central restricting member, which has a relatively small moving amount when the movable unit 114 is driven. Therefore, the length of the heat conductive sheet 126 that connects the movable unit 114 and the chassis 110 can be reduced. As a result, the heat radiating path can be reduced and the heat radiating (or dissipating) performance can be improved. The central restrictor is also close to the image sensor 115, which is a heat source. Disposing the restricting shafts 123 on the projection of the image sensor 115 (within the projected area) can reduce the path and efficiently radiate heat.

A description will now be given of the heat conductive sheets 126 that thermally connect the restricting shafts 123 and the chassis 110. Each heat conductive sheet 126 has a shape extending in a total of four directions from the two restricting shafts 123 on both sides in the X and Y directions, respectively, and is attached to the restricting shafts 123 and the chassis 110 with adhesive tape. The heat conductive sheet 126 has a bent portion (first bent portion) 126a in the X direction (first direction) and a bent portion (second bent portion) 126b in the Y direction (second direction different from the first direction) so as to follow the movement of the movable unit 114. Each bent portion has a length that will not break even if distances S1 and S2 between the restricting shafts 123 and the restricting holes 113b change.

This embodiment may change at least one of width W1 of the bent portion 126a in the Y direction and width W2 of the bent portion 126b in the X direction according to the load on the movable unit 114 in the XY directions. In other words, a length of the bent portion 126a in the Y direction and a length of the bent portion 126b in the X direction are different from each other. The bent portion 126b in the Y direction extends in the same direction as that of the imaging FPC 111, and the load during driving increases. Reducing the width W2 of the bent portion 126b in the Y direction can reduce the load. On the other hand, since the extending direction of the bent portion 126a in the X direction does not overlap the imaging FPC 111, heat radiating performance can be maintained by increasing the width W1. Adjusting at least one of the width and length of the heat conductive sheet 126 in this manner can achieve both controllability of the movable unit 114 and heat radiating performance.

In a case where the movable unit 114 moves in the rotational direction, as a distance between the center of the optical axis and the restricting shaft 123 decreases, a bending amount of the heat conductive sheet 126 becomes smaller, and conversely, as the distance between the center of the optical axis and the restricting shaft 123 increases, the bending amount of the heat conductive sheet 126 becomes larger. Therefore, adjusting the length of the heat conductive sheet 126 according to the distance between the center of the optical axis and the restricting shaft 123 can suppress breakage of the heat conductive sheet 126.

Figure 5A:
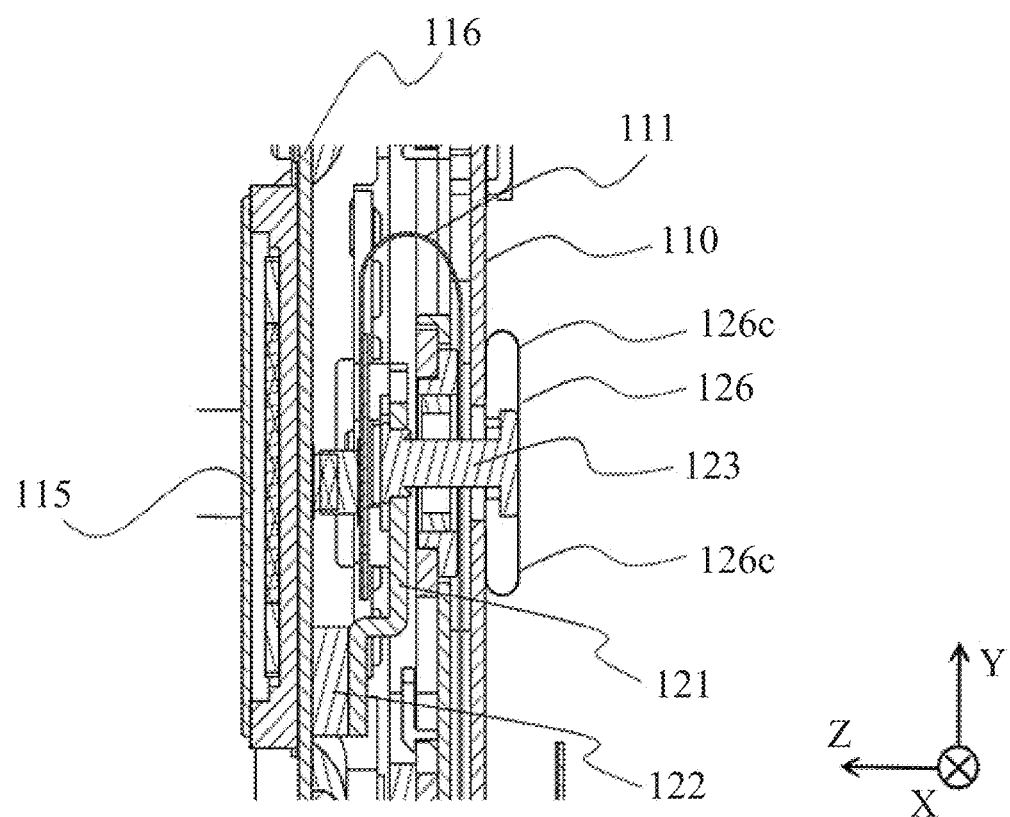
FIGS. 5A and 5B are a variation of a heat conductive sheet in the first embodiment.
Figure 5B:
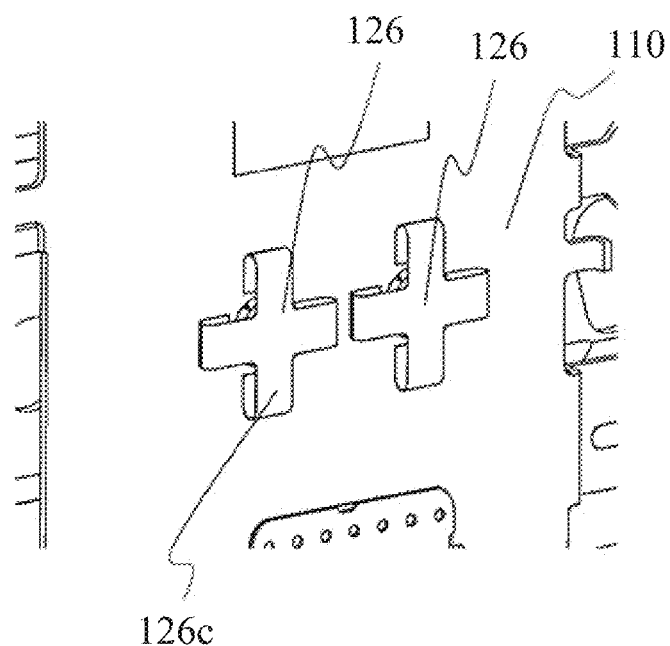

Referring now to FIGS. 5A and 5B, a description will be given of a variation of the heat conductive sheet 126. FIGS. 5A and 5B illustrate the variation of the heat conductive sheet 126. FIG. 5A is a sectional view illustrating the variation of the heat conductive sheet 126, and FIG. 5B is its rear perspective view. The shape of the heat conductive sheet 126 may be such that bent portions 126c are bent inward as illustrated in FIGS. 5A and 5B. This shape reduces the bulges in the Z direction of the bent portions of the heat conductive sheet 126, and saves space.

In order to further enhance the heat radiating effect of the heat conductive sheet 126, a plurality of heat conductive sheets 126 may be stacked, the number of extending portions may be increased, or the like. The heat conductive sheet 126 is not limited to a sheet member, and the movable unit 114 may be connected with an elastic member having high heat conductivity as long as it does not significantly affect the driving of the movable unit 114. The central restricting structure on the movable unit 114 in this embodiment is performed by the restricting shafts 123 and the restricting holes 113b, but is not limited to a combination of the shaft and the hole, and another structure may be used as long as it can restrict the movement of the movable unit 114 and transport heat.

This embodiment can efficiently exhaust heat from the image sensor 115, using the restricting shafts 123 at the center of the image sensor unit 106 as a heat radiating path.

Second Embodiment

Figure 6A:
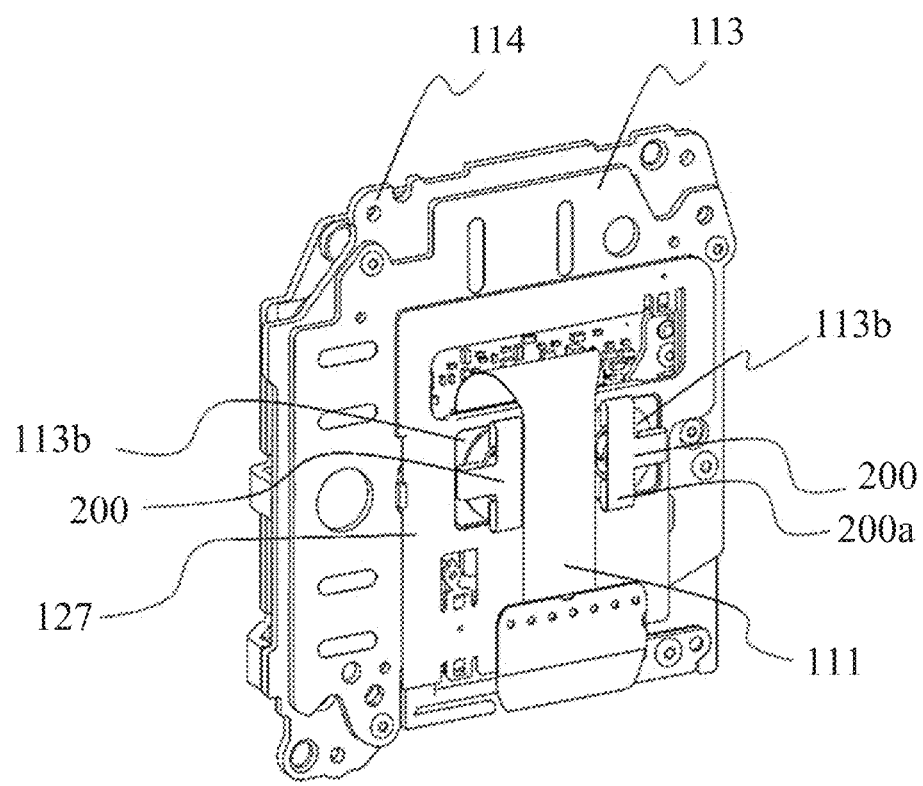
FIGS. 6A and 6B are configuration diagrams of an image sensor unit according to a second embodiment.
Figure 6B:
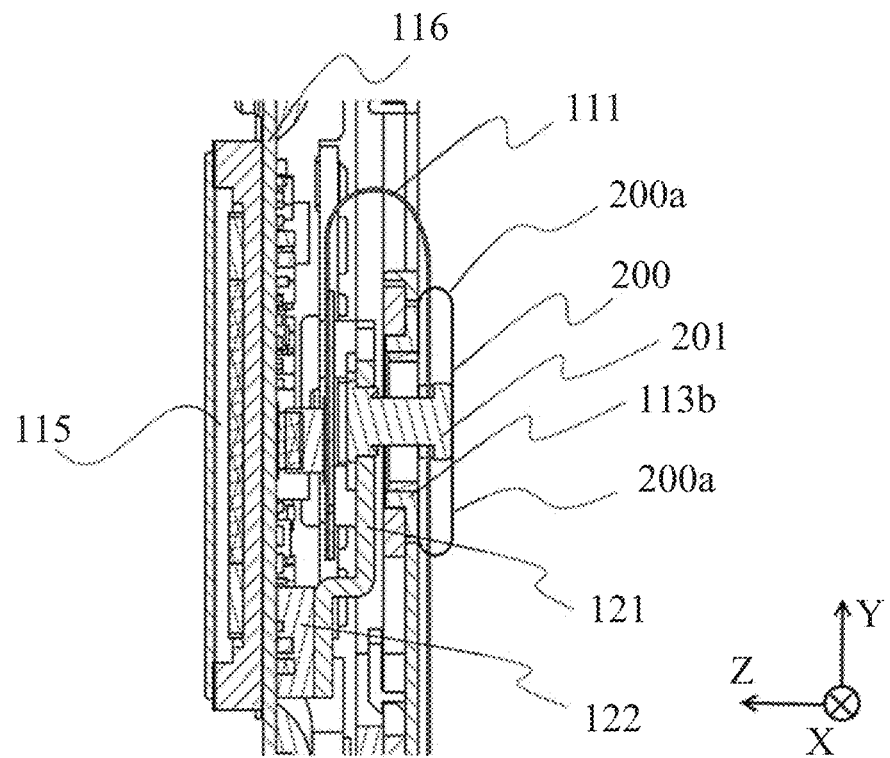

Referring now to FIGS. 6A and 6B, a description will be given of a second embodiment. This embodiment changes the heat radiation destination of the movable unit 114 of the first embodiment from the chassis (heat radiating metal plate) 110 to the fixed unit 113. The other basic configurations of this embodiment are similar to those of the first embodiment, and thus a detailed description of the common matters will be omitted by designating the same reference numerals.

FIGS. 6A and 6B are configuration diagrams of the image sensor unit 106 according to this embodiment. FIG. 6A is a rear perspective view of the image sensor unit 106, and FIG. 6B is a sectional view of the image sensor unit 106, respectively. The restricting shaft (restricting member) 201 is shorter than that in the first embodiment. The heat conductive sheet (first heat conductive member) 200 is attached so as to thermally connect the restricting shaft 201 and the fixed unit 113 around the restricting hole 113b. The heat conductive sheet 200 has extensions 200a that extend in three directions so as not to contact the imaging FPC 111.

The heat of the movable unit 114 is transmitted to the metal plate of the fixed unit 113 via the restricting shaft 201 and the heat conductive sheet 200. The heat transferred to the fixed unit 113 is transferred from the screw fixing part with the front base 102 to the front base 102. The heat can be dissipated by providing the heat conductive sheet 200 that connects the fixed unit 113, the front base 102, and the top cover. Thus, in a case where the chassis 110 becomes hot due to the heat of the IC on the main substrate 107, this embodiment can suppress the heat of the main substrate 107 from being transmitted to the image sensor unit 106.

Each embodiment can provide an image pickup apparatus that improves the heat radiating performance of an image sensor that is movable in a direction orthogonal to the optical axis direction.

While the disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2023-085414, which was filed on May 24, 2023, and which is hereby incorporated by reference herein in its entirety.

What is claimed is:

1. An image pickup apparatus comprising:
a movable unit that holds an image sensor;
a fixed unit that supports the movable unit movably in a direction orthogonal to an optical axis direction; and
a first heat conductive member configured to radiate heat from the movable unit,
wherein the movable unit includes a restricting member,
wherein the fixed unit has a contact portion configured to come into contact with the restricting member to restrict the movable unit from moving, and
wherein the first heat conductive member radiates the heat from the movable unit via the restricting member.

2. The image pickup apparatus according to claim 1, wherein the restricting member includes a restrictor configured to come into contact with the contact portion to restrict the movable unit from moving, and a heat radiator extending from the restricting member in the optical axis direction, and
wherein the first heat conductive member radiates the heat from the movable unit via the heat radiator.

3. The image pickup apparatus according to claim 2, wherein when viewed from the optical axis direction, a sectional area of the heat radiator is larger than that of the restrictor.

4. The image pickup apparatus according to claim 1, further comprising a heat radiating metal plate,
wherein the first heat conductive member radiates the heat from the movable unit to the heat radiating metal plate.

5. The image pickup apparatus according to claim 1, wherein the first heat conductive member radiates the heat from the movable unit to the fixed unit.

6. The image pickup apparatus according to claim 1, wherein the contact portion is a hole portion formed in the fixed portion, and
wherein the restricting member is inserted into the hole portion.

7. The image pickup apparatus according to claim 1, wherein the contact portion includes a buffer member, and
wherein the restricting member is configured to come into contact with the contact portion via the buffer member.

8. The image pickup apparatus according to claim 7, wherein the buffer member includes a second heat conductive member configured to radiate the heat from the movable unit, and
wherein the restricting member is configured to come into contact with the buffer member in a case where the image pickup apparatus is powered off.

9. The image pickup apparatus according to claim 1, wherein when viewed from the optical axis direction, the restricting member is disposed within a projected area of the image sensor.

10. The image pickup apparatus according to claim 1, wherein the image sensor and the restricting member are thermally connected so that the heat from the image sensor is radiated to the restricting member.

11. The image pickup apparatus according to claim 10, further comprising a third heat conductive member that is elastic and configured to connect the image sensor and the restricting member to each other.

12. The image pickup apparatus according to claim 1, wherein the first heat conductive member that is flexible.

13. The image pickup apparatus according to claim 12, wherein the first heat conductive member includes a first bent portion disposed along a first direction and a second bent portion disposed along a second direction different from the first direction.

14. The image pickup apparatus according to claim 13, wherein a length of the first bent portion in the second direction and a length of the second bent portion in the first direction are different from each other.

15. The image pickup apparatus according to claim 1, wherein the first heat conductive member includes a graphite sheet.

16. The image pickup apparatus according to claim 1, wherein the movable unit performs image stabilization by moving in the direction orthogonal to the optical axis direction.

* * * * *